(12) United States Patent
Farnsworth et al.

(10) Patent No.: US 6,508,593 B1
(45) Date of Patent: Jan. 21, 2003

(54) UNIVERSAL PANEL MOUNT SYSTEM FOR FIBER OPTIC CONNECTING DEVICES

(75) Inventors: Hilary Farnsworth, New Rochelle, NY (US); Igor Grois, Northbrook, IL (US); Jeffrey A. Matasek, Cedarburg, WI (US)

(73) Assignees: Molex Incorporated, Lisle, IL (US); Callabs Operations, Inc., Lisle, IL (US)

( * ) Notice: Subject to any disclaimer, the term of this patent is extended or adjusted under 35 U.S.C. 154(b) by 0 days.

(21) Appl. No.: 09/568,519

(22) Filed: May 9, 2000

(51) Int. Cl.[7] .................................................. G02B 6/38
(52) U.S. Cl. .......................................... 385/55; 385/134
(58) Field of Search ............................... 385/53, 55, 56, 385/58–60, 70–72, 76–78, 134, 136, 147

(56) References Cited

U.S. PATENT DOCUMENTS

| | | | | |
|---|---|---|---|---|
| 4,805,980 A | * | 2/1989 | Mackenroth | 385/60 |
| 4,834,486 A | * | 5/1989 | Walker | 385/134 |
| 5,067,783 A | * | 11/1991 | Lampert | 385/60 |
| 5,214,735 A | | 5/1993 | Henneberger et al. | 385/136 |
| 5,333,221 A | * | 7/1994 | Briggs et al. | 385/55 |
| 5,734,776 A | | 3/1998 | Puetz | 385/134 |
| 5,949,946 A | | 9/1999 | Debortoli et al. | 385/134 |
| 6,146,192 A | | 11/2000 | Cabalka et al. | 439/540.1 |
| 6,186,670 B1 | | 2/2001 | Austin et al. | 385/55 |
| 6,234,836 B1 | * | 5/2001 | Schmidt et al. | 439/557 |
| 6,367,984 B1 | * | 4/2002 | Stephenson et al. | 385/53 |

* cited by examiner

*Primary Examiner*—John D. Lee
*Assistant Examiner*—Mike Stahl
(74) *Attorney, Agent, or Firm*—A. A. Tirva (57) ABSTRACT

A universal panel mount system is provided for mounting any one of a plurality of differently configured fiber optic adapters in a singularly configured common opening in a panel. A universal receptacle housing is mounted in the opening in the panel. A set of differently configured fiber optic adapters each is mountable in the universal receptacle housing. Each adapter includes coupling means for mating with one of a plurality of differently configured fiber optic connectors.

13 Claims, 7 Drawing Sheets

UNIVERSAL PANEL MOUNT SYSTEM FOR FIBER OPTIC CONNECTING DEVICES

FIELD OF THE INVENTION

This invention generally relates to the art of fiber optic connectors and, particularly, to a universal panel mount system for mounting any one of a plurality of differently configured fiber optic connecting devices in a common opening in a panel.

BACKGROUND OF THE INVENTION

A number of fiber optic connectors have become standard connector configurations in the optical fiber industry. One fiber optic connector is referred to as an "ST" connector originally developed by AT&T. An ST connector coupling requires two connectors to be connected in a linear motion and then relatively rotated, sort of on the order of a bayonet-and-pin coupling. Another popular optical fiber connector is known as an "SC" connector. An SC connector is connected to another SC connector through a coupling requiring only linear motion. A further standard optical fiber connector is known as an "FC" connector. Two FC connectors are optically coupled by threadably turning the FC connectors onto an externally threaded portion of the coupling. Still another optical fiber connector is known as an "MTP" connector which is coupled by linear motion only and incorporates flexible latch arms to hold the connector in coupled condition.

One of the problems with having such a number of commonly used connectors which have become standard in the industry is that more than one of the connectors may be used in an overall system. This requires multiple adapters, multiple receptacles or other connecting devices or peripheral components to accommodate the different configurations of connectors. For instance, it often becomes necessary to arrange a plurality of optical fiber connectors in a panel to facilitate multi-fiber connections, and the connectors which are to be mounted in or through the panel may be any one or more of the ST, SC, FC and/or MTP type connectors. Therefore, it is not uncommon to have an inventory of differently configured adapters mountable in different sizes of openings in the panel, all of which leads to inefficient and expensive systems. The present invention is directed to solving these problems by providing a universal panel mount system for mounting any one of the differently configured connectors and/or their adapters in a common opening in a panel.

SUMMARY OF THE INVENTION

An object, therefore, of the invention is to provide a universal panel mount system for mounting any one of a plurality of differently configured fiber optic adapters in a singularly configured common opening in a panel.

In the exemplary embodiment of the invention, the panel has an opening of a given configuration, such as a rectangular or square opening. A universal receptacle housing is mountable in the opening in the panel.

According to one aspect of the invention, first, second, third and fourth adapters are provided for MTP, SC, ST and FC or other types of fiber optic connectors. Each adapter includes coupling means for mating with its respective type of fiber optic connector. The universal receptacle housing and each adapter for each type of fiber optic connector include complementary interengaging latch means whereby the adapters are interchangeably mounted and held within the receptacle housing. Therefore, the single or universal receptacle housing can mount any one of the different standard connectors to or through the panel by means of the differently configured adapters which all are mountable in the universal receptacle housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE EMBODIMENT

Figure 1:
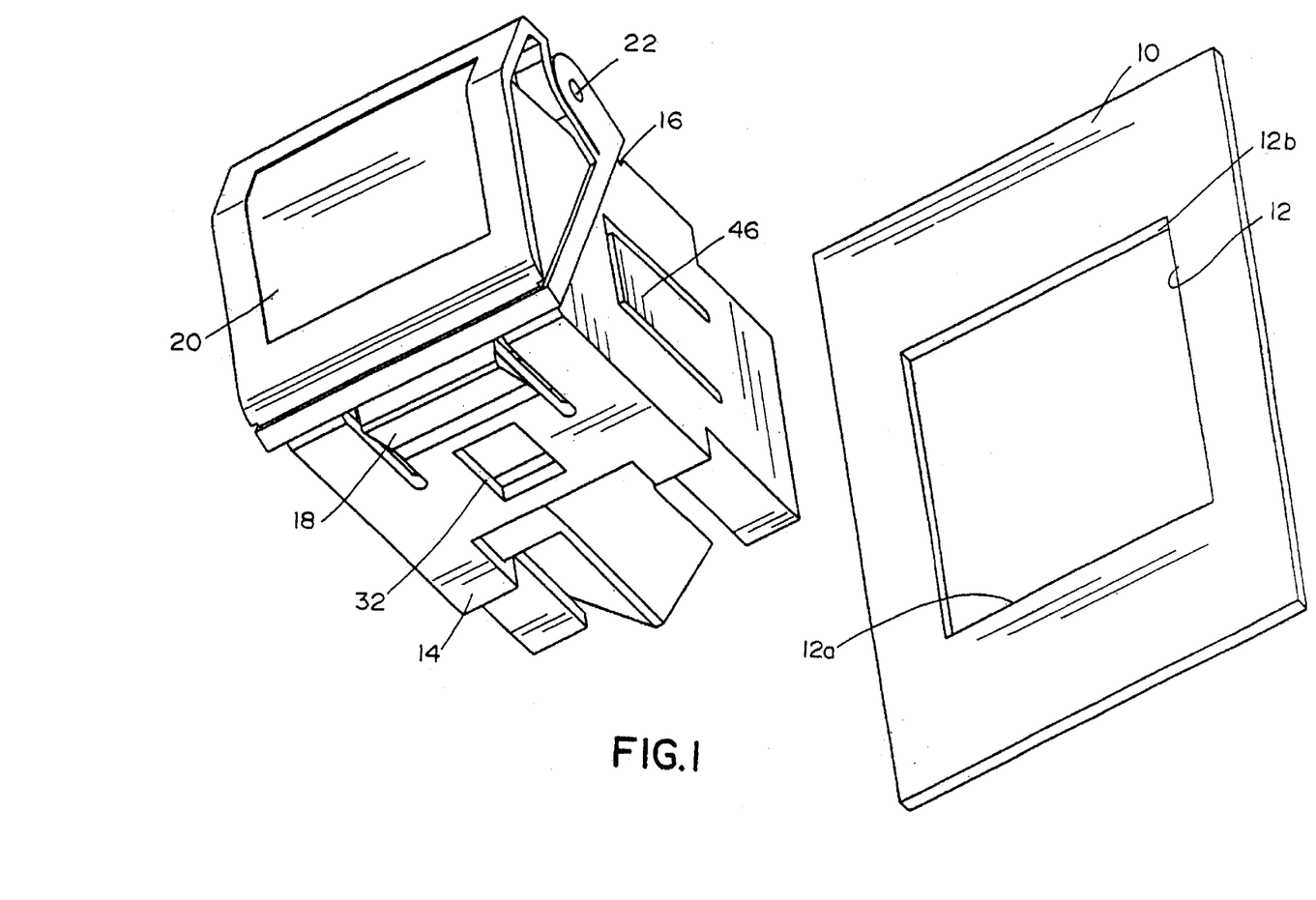
FIG. 1 is a perspective view of the universal receptacle housing in conjunction with a panel having an opening within which the housing is mounted.

Referring to the drawings in greater detail, and first to FIG. 1, a panel 10 is shown to include an opening 12 of a given configuration, namely a rectangular or square configuration. The opening has a bottom edge 12a and a top edge 12b. A universal receptacle housing 14 of a generally rectangular or square configuration is mountable within opening 12 in panel 10. The housing has a groove or channel 16 which embraces top edge 12b of the opening, while a latch arm 18 snappingly engages bottom edge 12a of the opening to hold the receptacle housing in the panel. The housing may be a one-piece structure unitarily molded of dielectric material such as plastic or the like, and latch arm 18 may be molded integrally therewith to flex relative thereto. Finally, a door or shutter 20 is pivotally mounted to receptacle housing 14, as at 22, to provide protection for the interior of the housing.

Figure 2:
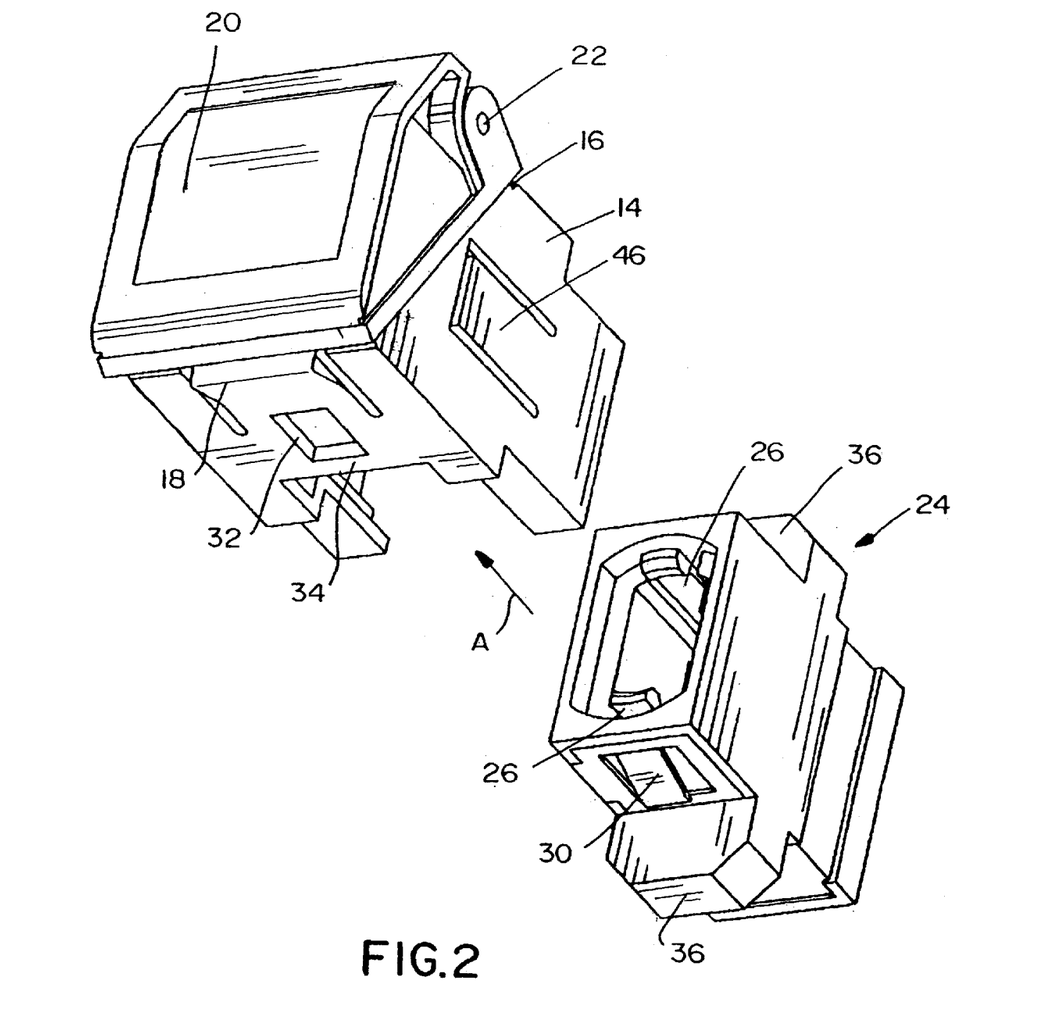
FIG. 2 is a perspective view of the receptacle housing in conjunction with an MTP adapter.
Figure 3:
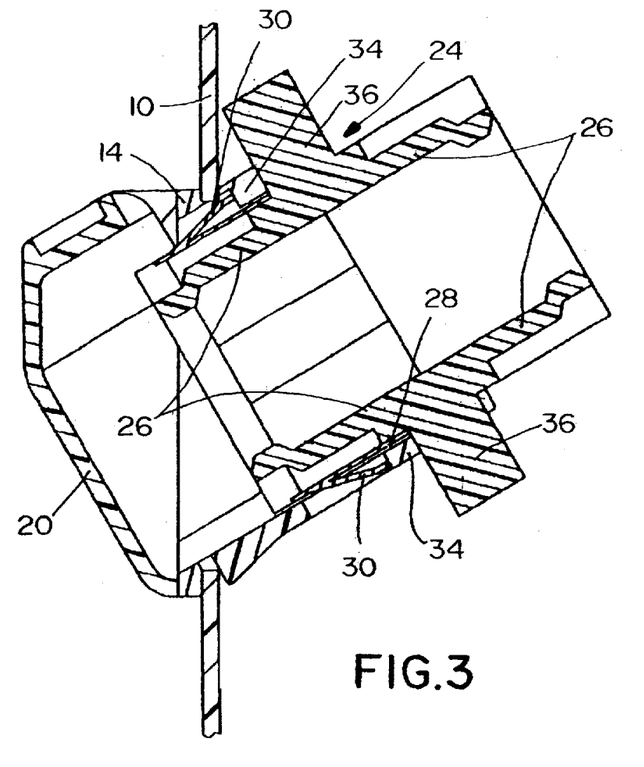
FIG. 3 is a section of the receptacle housing and MTP adapter interconnected and mounted in the opening in the panel.
Figure 4:
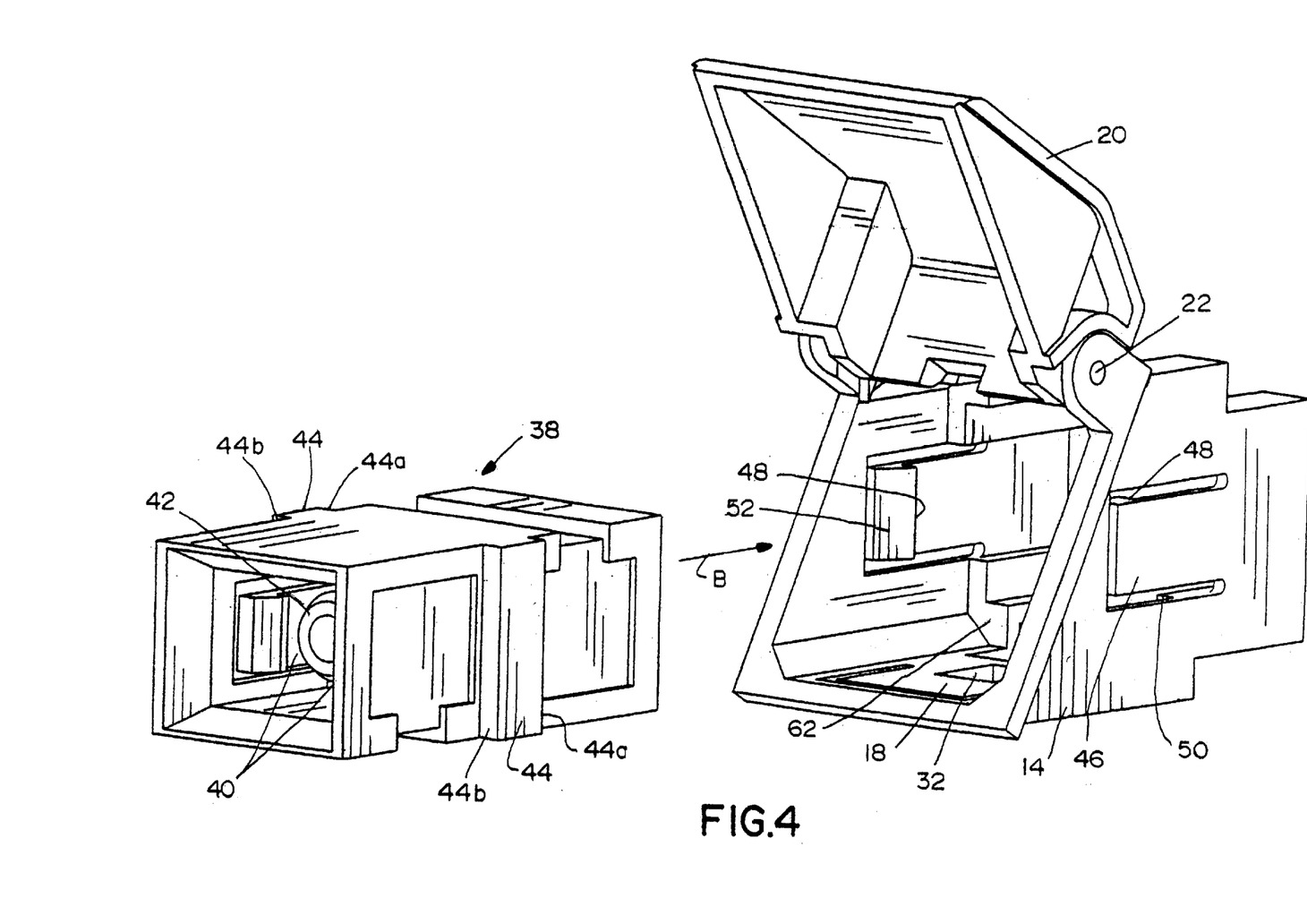
FIGS. 4 and 5 are views similar to those of FIGS. 2 and 3, but showing an "SC" type adapter.
Figure 5:
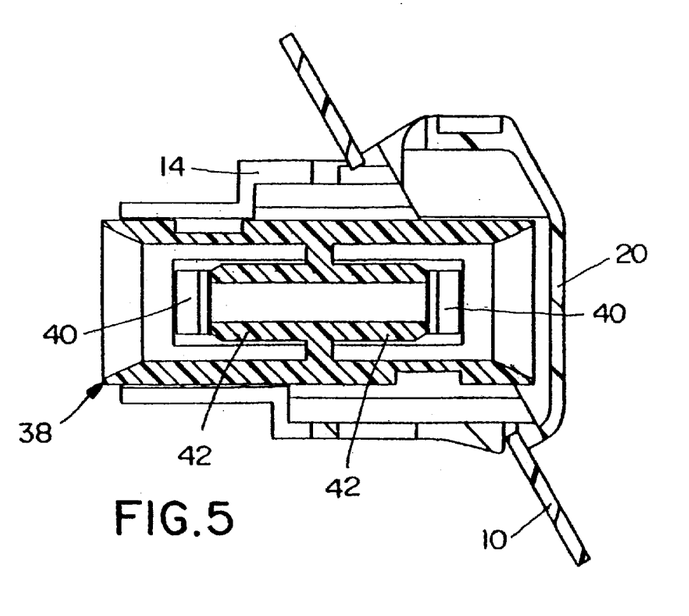
Figure 6:
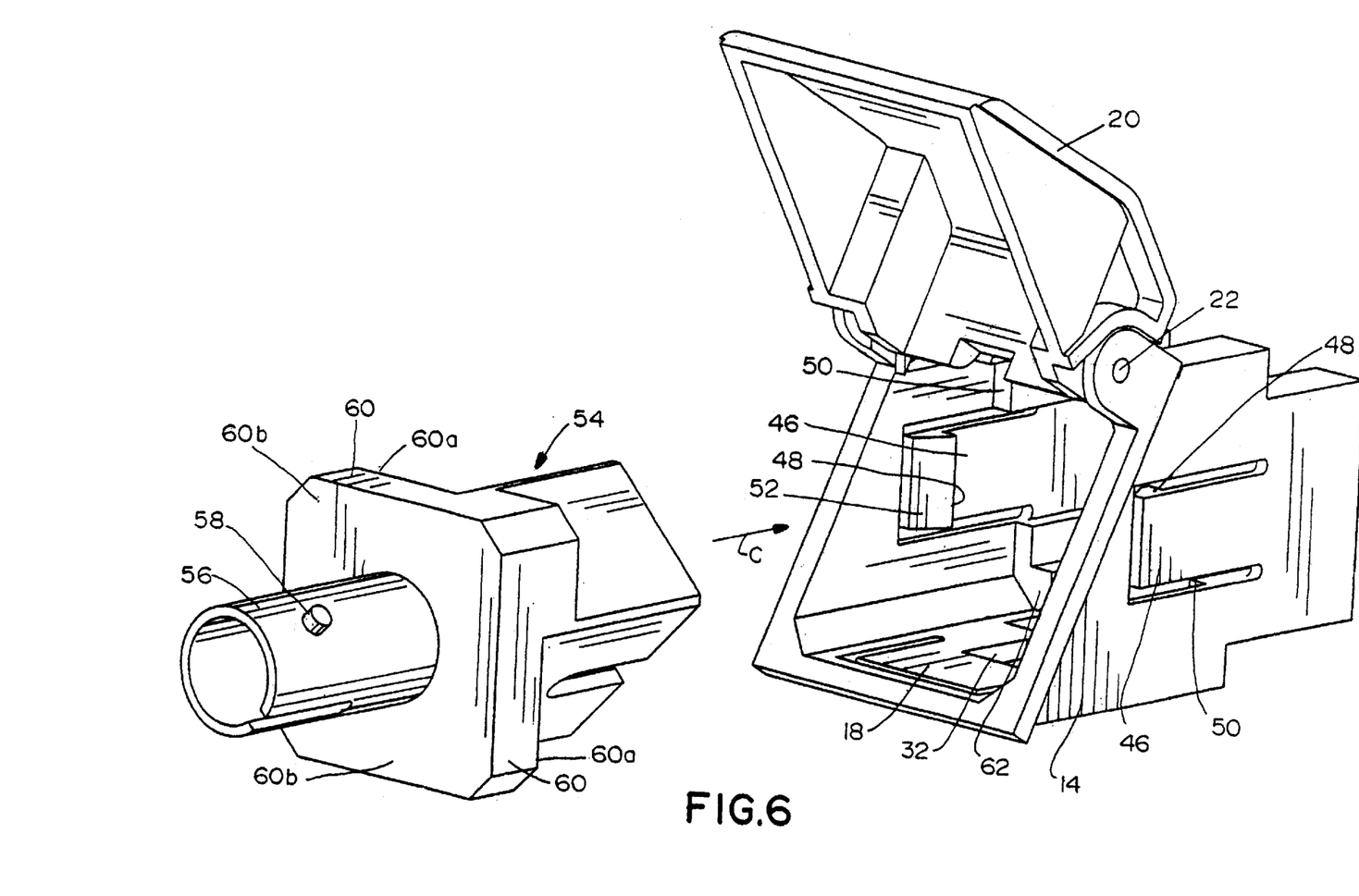
FIGS. 6 and 7 are views similar to those of FIGS. 2 and 3, but showing an ST/SC adapter.
Figure 7:
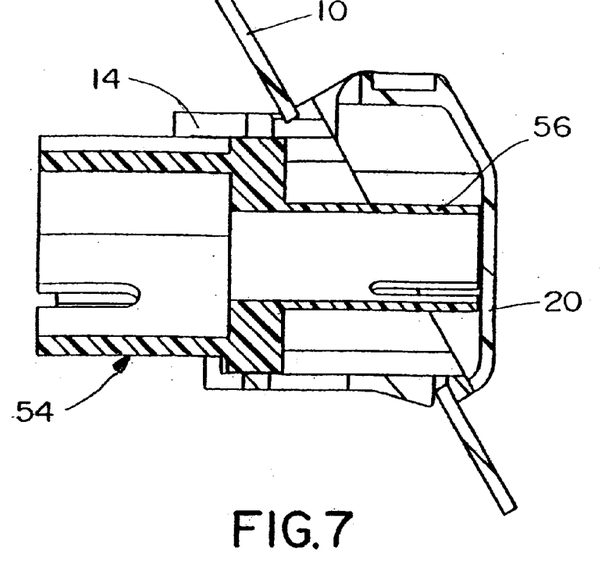
Figure 8:
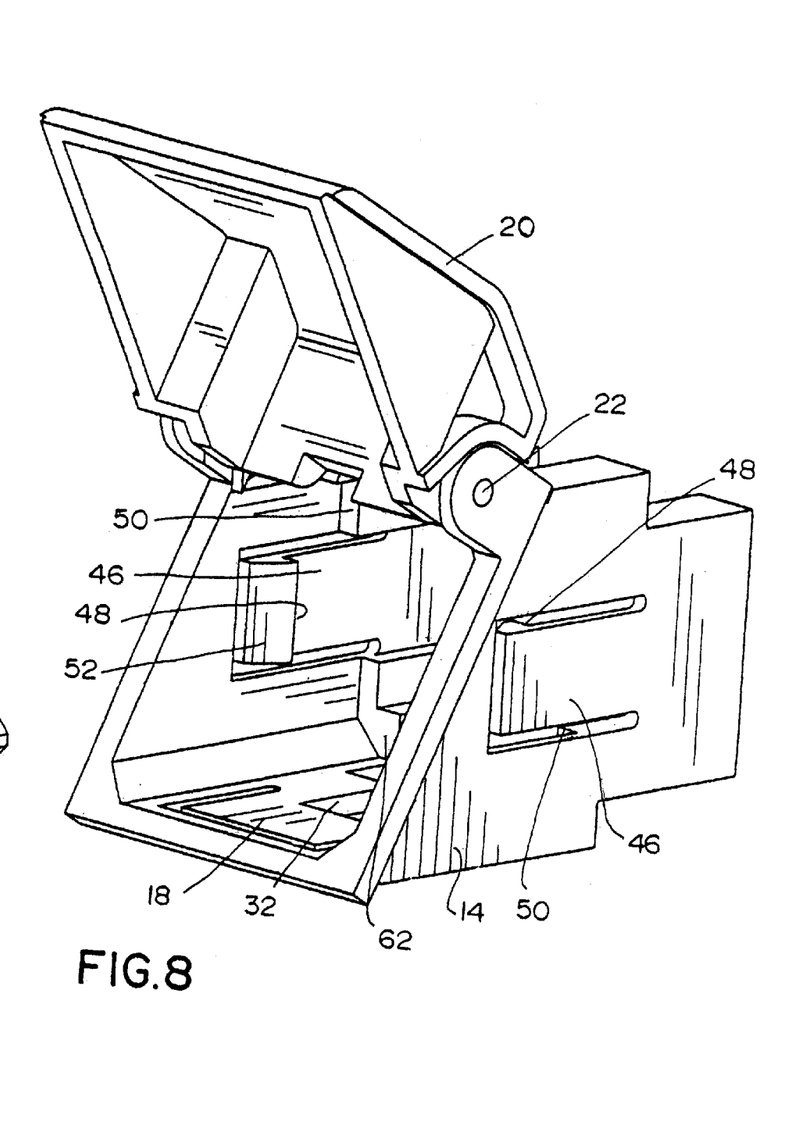
FIGS. 8 and 9 are views similar to those of FIGS. 2 and 3, but showing an FC/SC adapter.
Figure 9:
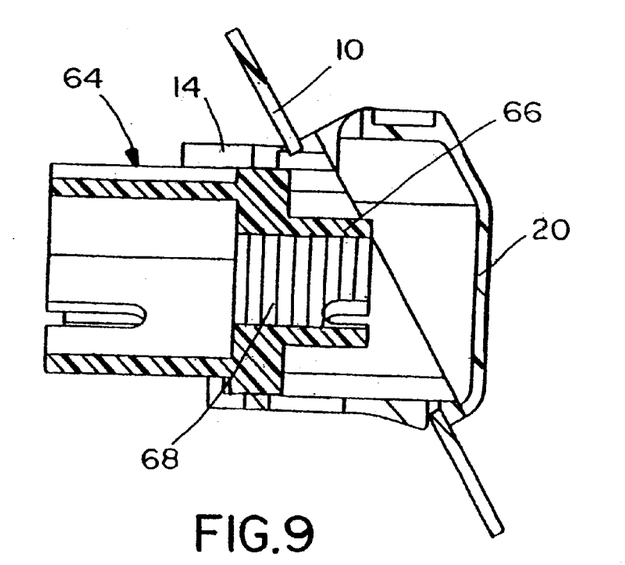

Universal receptacle housing 14 is adapted for mounting any one of a plurality of differently configured fiber optic adapters in the singularly configured or common opening 12 in panel 10. Although the invention is not limited to the specific configurations shown herein, receptacle housing 14 is adapted for receiving an MTP/MTP adapter as shown in FIGS. 2 and 3; an SC/SC adapter as shown in FIGS. 4 and 5; an ST/SC adapter as shown in FIGS. 6 and 7; and an FC/SC adapter as shown in FIGS. 8 and 9. Of course, housing 14 can be constructed to accommodate different adapters for different types of fiber optic connectors or combinations thereof than shown in FIGS. 2–9.

More particularly, FIGS. 2 and 3 show an MTP/MTP adapter, generally designated 24, for mounting into receptacle housing 14 in the direction of arrow "A" (FIG. 2). FIG. 3 shows adapter 24 fully mounted in receptacle housing 14 which, in turn, is mounted within the opening in panel 10. The adapter is an MTP/MTP adapter because it has an MTP coupling means including a pair of latch arms 26 at each opposite end of the adapter. Therefore, a pair of standard MTP-type fiber optic connectors can be coupled through adapter 24 in a linear motion and latched by arms 26. The adapter may be molded of plastic material, with arms 26 molded integrally therewith. A metal spring clip 28 is insert molded about the adapter and includes a pair of spring arms 30 which hold the adapter within receptacle housing 14. More particularly, receptacle housing 14 has a pair of openings 32 on opposite sides thereof which form narrow bar portions 34 of the housing. As seen in FIG. 3, these narrow bar portions of the housing become trapped between spring arms 30 and a pair of outwardly projecting flanges 36 of the adapter to hold the adapter in receptacle housing 36. It should be pointed out that the opposite or right-hand end of adapter 24 could have a different configuration for receiving a different standard-type fiber optic connector.

FIGS. 4 and 5 show an SC/SC adapter, generally designated 38, for mounting in receptacle housing 14 in the direction of arrow "B" (FIG. 4), with shutter 20 raised or opened to receive the adapter. The SC/SC adapter has coupling means in the form of a pair of latch arms 40 in each opposite end thereof for coupling with a standard SC-type fiber optic connector. The SC adapter also has internal cylindrical tubes 42 for receiving projecting ferrules from the standard SC-type connectors. Again, adapter 38 may be fabricated of dielectric material such as molded plastic or the like, and arms 40 may be molded integrally therewith.

Complementary interengaging latch means are provided between adapter 38 and receptacle housing 14 to hold the adapter in the housing. Specifically, the adapter has an outwardly projecting flange 44 on two opposite sides thereof. The flange defines latch shoulders 44a and 44b on opposite sides thereof. Universal housing 14 includes a pair of integrally molded latch arms 46 having latch hooks 48. When adapter 38 is inserted into receptacle housing 14 in the direction of arrow "B" (FIG. 4), shoulders 44a defined by flanges 44 of the adapter abut against stop shoulders 50 formed on the inside of the receptacle housing. As the adapter moves into the housing, flanges 44 engage chamfered surfaces 52 at the distal ends of latch arms 46 and bias the latch arms outwardly until latch hooks 48 snappingly latch behind shoulders 44b of flanges 44 of the adapter. The adapter now is securely held within the receptacle housing as seen in FIG. 5.

FIGS. 6 and 7 show an ST/SC adapter, generally designated 54. The ST coupling is at the left of the adapter and the SC coupling is at the right of the adapter as viewed in the drawings. The ST coupling includes a cylindrical extension 56 which has a pin 58 for coupling the adapter in a bayonet-and-pin fashion with a standard ST-type fiber optic connector. Like adapter 38 in FIGS. 4 and 5, adapter 54 has an outwardly projecting flange 60 on opposite sides thereof forming shoulders 60a and 60b on opposite sides of the flange. Adapter 54 is inserted into receptacle housing 14 in the direction of arrow "C" (FIG. 6) and latch arms 46 and latch hooks 48 are effective to engage shoulders 60b of flanges 60 of the adapter when the adapter is fully inserted into the housing. However, the housing has another set of diagonally disposed stop shoulders 62 for engaging shoulders 60a of flanges 60 of the adapter. In other words, diagonally disposed stop shoulders 50 within the receptacle housing are provided for adapter 38 (FIG. 4) while the other diagonally disposed stop shoulders 62 are provided for adapter 54 (FIG. 6). It can be seen in either FIGS. 4 or 6 that stop shoulders 50 are at different axial locations than stop shoulders 62.

FIGS. 8 and 9 show an FC/SC adapter, generally designated 64. In other words, adapter 64 has an FC coupling at the left thereof and an SC coupling at the right thereof as viewed in the drawings. The FC coupling includes a cylindrical extension 66 having internal threads 68 for coupling with a standard FC-type fiber optic connector. Adapter 64 has an outwardly projecting flange 70 defining opposite shoulders 70a and 70b which cooperate with latch arms 46 and latch hooks 48 as well as stop shoulders 62 of receptacle housing 14 the same as described above in relation to adapter 54 in FIG. 6. However, it can be seen that adapters 54 and 64 are configured for coupling with different types of standard fiber optic connectors, namely an ST connector and an FC connector, respectively.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim.

1. A universal panel mount system for mounting any one of a plurality of differently configured fiber optic adapters in a singularly configured common opening in a panel, comprising:

a panel having an opening of a given configuration;

a universal receptacle housing for mounting in the opening in the panel;

a first adapter mountable in the universal receptacle housing and including coupling means for mating with at least an MTP-type fiber optic connector;

complementary interengaging latch means between the first adapter and the receptacle housing to hold the first adapter in the housing;

a second adapter mountable in the universal receptacle housing and including coupling means for mating with at least an SC-type fiber optic connector;

complementary interengaging latch means between the second adapter and the receptacle housing to hold the second adapter in the housing, wherein said complementary interengaging latch means between the second adapter and the universal receptacle housing comprise at least one flexible latch arm on the receptacle housing engageable with a latch surface on the second adapters;

a third adapter mountable in the universal receptacle housing and including coupling means for mating with at least an ST-type fiber optic connector;

a complementary interengaging latch means between the third adapter and the receptacle housing to hold the third adapter in the housing;

a fourth adapter mountable in the universal receptacle housing and including coupling means for mating with at least an FC-type fiber optic connector; and complementary interengaging latch means between the fourth adapter and the receptacle housing to hold the fourth adapter in the housing.

2. The universal panel mount system of claim 1 wherein said complementary interengaging latch means between the first adapter and the universal receptacle housing comprise a spring clip on the first adapter latchable in an opening in the housing.

3. The universal panel mount system of claim 1, further including opposing abutment shoulders between the second adapter and the universal receptacle housing.

4. The universal panel mount system of claim 1 wherein said complementary interengaging latch means between the third adapter and the universal receptacle housing comprise at least one flexible latch arm on the receptacle housing engageable with a latch surface on the third adapter.

5. The universal panel mount system of claim 4, further including opposing abutment shoulders between the third adapter and the universal receptacle housing.

6. The universal panel mount system of claim 1 wherein said complementary interengaging latch means between the fourth adapter and the universal receptacle housing comprise at least one flexible latch arm on the receptacle housing engageable with a latch surface on the fourth adapter.

7. The universal panel mount system of claim 6, further including opposing abutment shoulders between the fourth adapter and the universal receptacle housing.

8. A universal panel mount system for mounting any one of a plurality of differently configured fiber optic adapters in a singularly configured common opening in a panel, comprising:

a universal receptacle housing for mounting in the opening in the panel;

at least first, second, third and fourth adapters interchangeably mounted in the universal receptacle housing and each adapter including coupling means different from the other adapters for mating with one of a plurality of different types of fiber optic connectors; and complementary interengaging latch means between each adapter and the receptacle housing to hold the respective adapter in the housing, wherein said complementary interengaging latch means between at least one of the second, third and fourth adapters and the universal receptacle housing comprise at least one flexible latch arm on the receptacle housing engageable with a latch surface on the one adapter.

9. The universal panel mount system of claim 8 wherein said complementary interengaging latch means between the first adapter and the universal receptacle housing comprise a spring clip on the first adapter latchable in an opening in the housing.

10. The universal panel mount system of claim 8 further including opposing abutment shoulders between the receptacle housing and the at least one of the second, third and fourth adapters.

11. A universal panel mount system for mounting any one of a plurality of differently configured fiber optic adapters in a singularly configured common opening in a panel, comprising:

a universal receptacle housing for mounting in the opening in the panel;

a set of different configured fiber optic adapters each being mountable in the universal receptacle housing, and each adapter including coupling means for mating with one of a plurality of differently configured fiber optic connectors, and wherein said universal receptacle housing includes a flexible latch arm engageable with a latch surface on at least one of the adapters.

12. The universal panel mount system of claim 11 wherein said one of said adapters includes a spring clip latchable in an opening in the universal receptacle housing.

13. The universal panel mount system of claim 11, including opposing abutment surfaces between the universal receptacle housing and the at least one adapter.

* * * * *

UNITED STATES PATENT AND TRADEMARK OFFICE
CERTIFICATE OF CORRECTION

PATENT NO. : 6,508,593 B1  Page 1 of 1
APPLICATION NO. : 09/568519
DATED : January 21, 2003
INVENTOR(S) : Farnsworth et al.

It is certified that error appears in the above-identified patent and that said Letters Patent is hereby corrected as shown below:

On Title Page (item 73)
The name of the second assignee as "Callabs Operations, Inc.". should be deleted The correct name of the second assignee should read as "Tellabs Operations, Inc."

Signed and Sealed this

First Day of August, 2006

JON W. DUDAS
*Director of the United States Patent and Trademark Office*